United States Patent
Kiest et al.

[11] Patent Number: 5,879,107
[45] Date of Patent: Mar. 9, 1999

[54] UNDERGROUND CONTAMINATION IN SITU TREATMENT SYSTEM

[75] Inventors: John L. Kiest, Matteson, Ill.; Jerrold A. Trezzo, Porter, Ind.

[73] Assignee: Biomanagement Services, Inc., Tinley Park, Ill.

[21] Appl. No.: 791,379

[22] Filed: Jan. 30, 1997

Related U.S. Application Data

[60] Provisional application No. 60/012,364 Feb. 27, 1996.

[51] Int. Cl.$^6$ .................................................. B09C 1/10
[52] U.S. Cl. ..................... 405/128; 210/611; 210/747; 588/205
[58] Field of Search .................................... 166/246, 268, 166/271; 111/7.1, 7.2, 7.3, 7.4; 210/610, 611, 747; 405/128, 263, 264, 269; 435/262.5; 588/209

[56] References Cited

U.S. PATENT DOCUMENTS

| | | | |
|---|---|---|---|
| 4,401,569 | 8/1983 | Jhaveri et al. | 210/610 |
| 4,849,360 | 7/1989 | Norris et al. | 405/128 X |
| 5,006,250 | 4/1991 | Roberts et al. | 210/747 X |
| 5,061,119 | 10/1991 | Balthaus et al. | 405/128 |
| 5,133,625 | 7/1992 | Albergo et al. | 405/263 |
| 5,172,709 | 12/1992 | Eckhardt et al. | 134/95.1 |
| 5,264,018 | 11/1993 | Koenigsberg et al. | 71/903 X |
| 5,279,740 | 1/1994 | Basile et al. | 210/610 |
| 5,286,140 | 2/1994 | Mather | 405/128 |
| 5,304,704 | 4/1994 | Kammeraad | 588/249 |
| 5,362,400 | 11/1994 | Martinell | 210/747 X |
| 5,415,777 | 5/1995 | Krempen et al. | 435/262.5 |
| 5,525,008 | 6/1996 | Wilson | 405/128 |
| 5,623,992 | 4/1997 | Shaw | 210/747 X |
| 5,641,020 | 6/1997 | Cherry et al. | 166/250.1 |

Primary Examiner—George Suchfield
Attorney, Agent, or Firm—Richard G. Kinney

[57] ABSTRACT

A system and process for delivering fluids into subsurface contaminated soil and ground water to enhance in situ microbial degradation of contaminants. The system consists of a high pressure/low volume slurry pump driven by an internal combustion engine. Pressure and volume are variable to suit site-specific subsurface soil conditions (e.g. texture, intrinsic permeabilities, etc.). The high pressure fluid liquifies the soil in front of the probe tip allowing the probe to be easily advanced by hand into the subsurface while the low volume prevents driving the contaminants. Microorganisms, soluble and insoluble nutrients, surfactants and chemical peroxygens and also gases can be delivered into the subsurface with this system. After delivery of the fluids, the probe is withdrawn by hand.

4 Claims, 4 Drawing Sheets

CUTAWAY VIEW OF UNDERGROUND POLUTED ZONE

CUTAWAY VIEW OF UNDERGROUND POLUTED ZONE

CUTAWAY VIEW OF UNDERGROUND POLUTED ZONE

UNDERGROUND CONTAMINATION IN SITU TREATMENT SYSTEM

FIELD OF THE INVENTION

The present invention relates to a method and apparatus for treatment in situ of underground contamination and is especially concerned with the treatment of hydrocarbon underground pollution by biodegradation.

CROSS-REFERENCE TO PROVISIONAL APPLICATION

Claim is made under §35 U.S.C. 119 to the benefit of the filing date of Provisional application Ser. No. 60/012,364, filed on Feb. 27, 1996, naming as inventors, John L. Kiest and Jerrold A. Trezzo, the inventors named herein.

BACKGROUND OF THE INVENTION

Treating underground pollution of soil and water that is caused by leaked hydrocarbons or chemicals is a vexing problem. Underground tanks containing oils, benzene, gasoline and the like, have often leaked their contents slowly into the surrounding soils over decades. The pollutant has seeped slowly through and saturated different geologic strata that do not permit easy or quick flow. As a result, the removal of the pollution from such soils is difficult, time consuming and cost prohibited. A simple pumping out of ground water and treating it may temporarily lower the detected level of pollution, but over a period of time, additional contaminant leaches out of the contaminated soils and the level detected in the underground water goes back up. Leaching and water treatment out of the ground is described in U.S. Pat. No. 4,401,569. It has been suggested that the soil be, in effect, mined, removed, treated and then, perhaps, returned. See, for example, U.S. Pat. Nos. 5,415,777; 5,286,140; 5,172,709 and 4,849,360. These are expensive processes that involve a great deal of disturbance to the site and effectively remove the site from any economic use during the process.

It has also been suggested that fluids containing bioremediation agents be injected into the soil and water in situ. See for example, U.S. Pat. Nos. 5,133,625 and 5,304,704.

Although in situ bioremediation is becoming increasingly popular, the technical difficulties involved in delivering microbes, nutrients and oxygen to all the contaminated media have restricted its effectiveness. In the past, amendment fluids have been delivered through injection wells or infiltration trenches allowing natural migration to deliver the fluids throughout the contaminated media. While these techniques may be effective at high permeability sites, the results of in situ bioremediation at low permeability sites has typically been discouraging and ineffective.

Finally, combinations of these techniques with features such as steam injection and a multitude of wells (borrowed from oil field extraction) have been proposed. See for example, U.S. Pat. No. 5,279,740.

While these prior art techniques and systems have advantages in some circumstances, they all suffer from economic drawbacks or time drawbacks. That is, they are either quite expensive to carry out and disruptive of the site or they take a very long time to be effective especially when the pollutant is contaminated in difficult geologic soil conditions. There thus exists a need for an economical system that does not disrupt the site but which can deal with difficult and different underground soils in situ and still achieve substantial results in a reasonable period of time.

SUMMARY OF THE INVENTION

In overcoming one or more drawbacks of the prior art, the present invention provides a process that uses a pattern of relatively closely spaced vertical lancings of the underground zone of contaminants dropped from the surface, using a high pressure low volume fluid infusion of a water slurry of time-released oxygen compound providing chemicals and (depending upon the pollutant and the underground soil conditions) nutrients and/or microbes that biodegrade the pollutant. The process starts by generally defining the underground zone of pollution and then injecting, using a water-jet removable lance, the fluid under pressure as the lance is driven up and down through the zone. The pressurized fluid is thus driven down and eventually around the path of the lance to impregnate a core through the contaminated soil with the fluid. The injection is continued until the core is saturated as indicated by the welling up of the fluid at the surface around the injection base. The lance is then removed and moved over a relatively short distance (e.g. 10 feet) and reinserted vertically and the process of injecting a second vertical core through the zone is continued until the fluid wells up from the first lance hole. This is taken as indicating that the two cores have overlapped and that the soil between the two lancings in the zone has been saturated with the fluid. The spacing can be decreased or increased by trial and error and reference to the welling up at prior holes so as to determine an optimum spacing for the geology of the particular site. This process is continued until the entire zone has been lanced and overlapping cores of impregnated fluid substantially formed therein.

The fluid and the microbes are then allowed to biodegrade the contaminant over time and the level of contaminants checked periodically to verify the effectiveness of the treatment.

It is the feature of this system and process to deliver amendment fluids directly into low and high permeability subsurface media and to provide a timed-release of nutrients and oxygen rather than an instantaneous release in order to maintain a more viable microbial population of contaminant degraders thereby enhancing degradation rates.

Another feature of the invention is the apparatus used in practicing the process. This includes a tank for holding the slurry, means in the tank such as an air input for maintaining the material suspended therein, a high pressure low volume pump coupled to the tank and delivering its output to a hose connected to a lance made of a straight length of pipe with a nozzle at its free end, and means for controlling and powering the pump, and for controlling flow to the lance, all portably mounted on a vehicle such as a trailer for movement to and about the site.

ADVANTAGES

This invention delivers nutrients, microorganisms and oxygen supplements directly to all the contaminated media rather than depending on natural migration from widely spaced wells or infiltration trenches. This system is less invasive and disruptive than trenching and excavating. This system does not require ancillary equipment to drive the probe and is therefore more cost effective. This system is effective on low permeability sites as amendment fluid is forced into the contaminated media. Therefore, it can be utilized on sites that were previously considered unsuitable for in situ bioremediation. As the probe may, in most applications, be advanced by hand rather than a direct hydraulic push, risk of damage to underground utilities, piping and tanks is minimal. This feature allows the system to be utilized in close proximity to underground piping and tanks to treat the source areas. A large number of points can be treated in a relatively short time thereby reducing project costs. This system requires no expenditures for the installation of a large number of injection wells or a series of infiltration trenches or capital expenditures on costly remediation equipment. The variability of pressure and volume allows lower pressure/higher volume to be used at high permeability sites and higher pressure/lower volume to be used at low permeability sites.

The equipment includes a tank with means for creating and maintaining a slurry in the tank, which tank is connected to a pressure pump which selectively feeds fluid at relatively low volume and high pressure to a hose and ground penetration lance from whose free end the fluid is expelled. The zone of underground hydrocarbon contaminated earth is determined using conventional means such as a series of test borings. The presence and concentration of contamination is monitored by conventional means such as small diameter individual monitoring wells. The site is treated using a fluid consisting of a water slurry of magnesium peroxide, with urea, ammonium phosphate, ammonium sulfate or a monopotassium phosphate and/or organisms with attributes which can attack and break down the hydrocarbon pollutants into intermediate by-product and eventually into harmless carbon dioxide ($CO_2$) and water. The formulation of the fluid varies depending upon the particular hydrocarbon (e.g. heavy oil or benzene), the nature of the underground geologic composition (e.g. clay, sand, gravel, etc.), and the site geologic chemistry conditions (e.g. nutrients, minerals, pH, etc.). The process consists of inserting the fluid from the tank using the equipment by water-jetting the lance's free end generally vertically from the surface down through the zone such that fluid is forced outward transversely along the pipe's path to form a generally cylindrically shaped volume, or core of infused fluid. The initial insertion is considered substantially accomplished when the fluid is transmitted into and saturates the adjacent subsurface soil and wells up to the surface around the lance. The lance is then removed and inserted vertically a short distance (e.g. 10 feet) away from the initial insertion and its end is run up and down through the zone with fluid being expelled under pressure until a second infusion core along the lance's path is saturated with the fluid as indicated by fluid welling up out of the first hole. The process is then repeated in an adjacently spaced apart spot until the fluid wells out of the second hole. The process is then continued over the entire zone.

By trial and error the proper spacing between injections or radius of influence is determined so adjacent cores of infusion overlap each other. In this manner, fluids that stimulate the biodegradation of the petroleum hydrocarbon or chemicals are dispersed and infused throughout the zone. It is there after available to microorganisms for assimilation of the contaminants with the results being monitored over time. As necessary, additional infusion patterns can be laid down (interstitially with regards to the first pattern) if found necessary or desirable.

The invention, together with further advantages and features thereof, may best be understood by reference to the following description, taken in connection with the accompanying drawings, in the several figures of which like reference numerals identify like elements.

DETAILED DESCRIPTION

Figure 1:
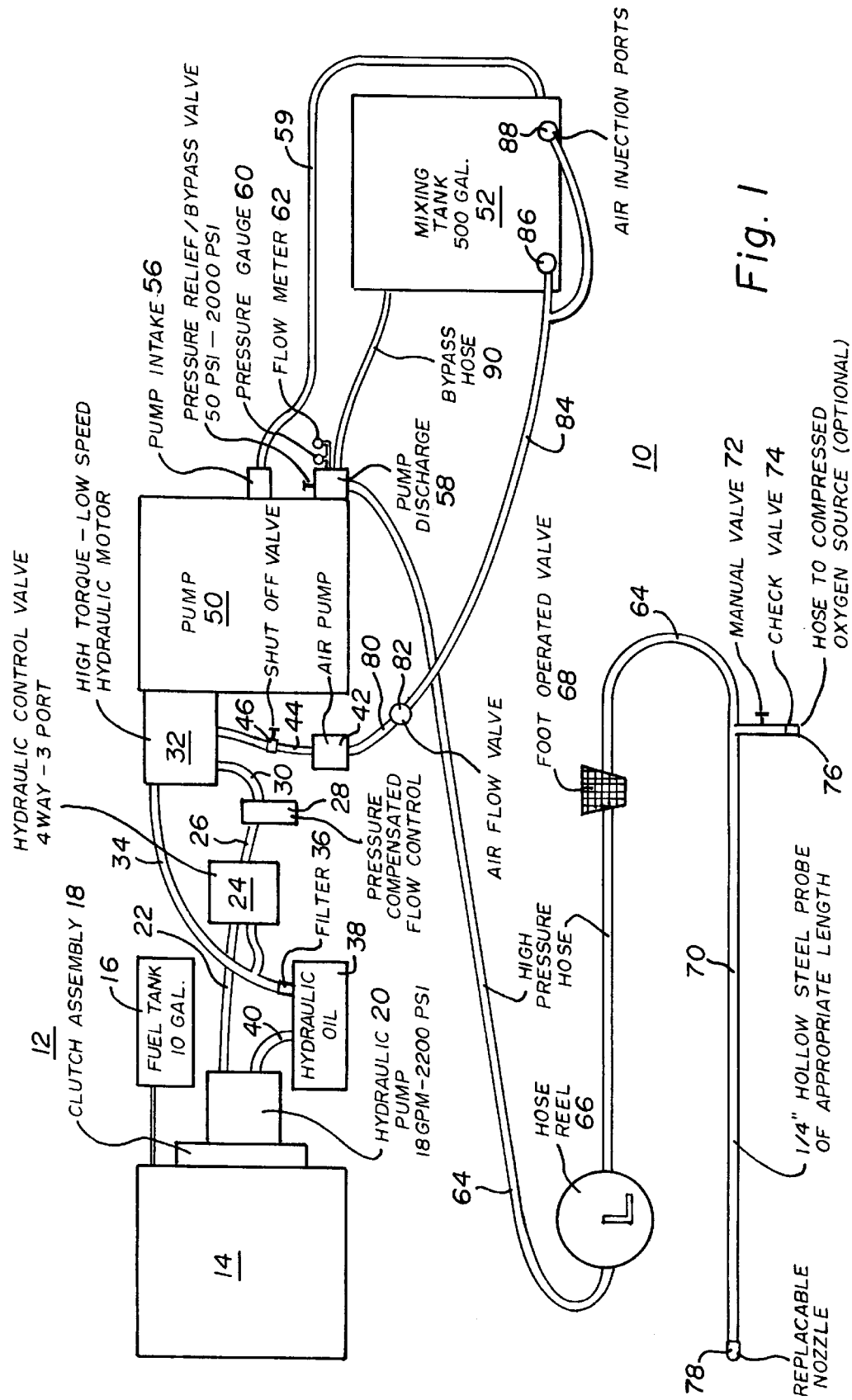
FIG. 1 is a schematic depiction of a preferred embodiment of apparatus constructed in accordance with the present invention.

Referring to the FIG. 1, there is depicted an example of a delivery system 10 constructed in accordance with the principles of the present invention. The system 10 includes a power section 12, which may be entirely conventional and thus need not be described here in detail. This section 12 includes an internal combustion engine 14, e.g. 20 HP made by Kohler, fed by a suitable fuel source 16. The internal combustion engine 14 drives a hydraulic pump 20 through a clutch assembly 18. The pump 20 provides oil under pressure over a line 22 to a control valve 24, a line 26, a pressure compensated flow control 28, and a line 30 to a high torque—low speed hydraulic motor 32. The spent hydraulic oil from the motor 32 is deliver via a line 34 and filter 36 to a sump 38 which supplies the input to the hydraulic pump 20 via a line 40. An air pump 42 is run off of the pump 32 as indicated by the line 44 (which includes a shut off valve 46). The hydraulic return line from the air pump (not shown) is fed back to the sump 38.

The section 12 serves to selectively drive a fluid pump unit 50 which provides fluid in accordance with the principles of the present invention at high pressure and low volume. The fluid is drawn in a water slurry form from a suitable sized mixing tank 52 via a line 54 into the pump intake 56. The high pressure fluid is fed from the pump 50 to a discharge unit 58 which is equipped with a pressure gauge 60 and flow meter 62 and fed through a high pressure hose 64 which is mounted to a reel 66 and through a foot operated valve 68 to a manual lance or probe unit 70. This probe 70 preferably is constructed of ¼ inch inside diameter steel pipe of appropriate length for the job (a 28 foot long pipe being used in one application). At the hose connected end of the probe 70, a manual valve 72 is provided, a one way check valve 74 and a hose connection 76 for optionally allowing oxygen gas to be injected underground via the probe 70. The free end of the probe or lance 70 is provided with a replaceable nozzle 78 having an outlet hole.

The air pump 42 provides mixing air via hose 80, valve 82 and hose 84 to inlets 86 and 88 into the tank 52. The tank includes an opening (not shown) at its top to the atmosphere so the air supplied by the pump 42 serves to bubble up the liquid in the tank so as to keep its contents in a slurry state and to prevent the solids therein from settling out of suspension.

A bypass hose 90 is provided between the pumps outlet 58 and the tank 52 so as to allow the pump 50 to continually operate even when the foot operated valve 68 is not depressed by the operator handling the probe 70 to allow fluid flow through the probe.

Figure 2:
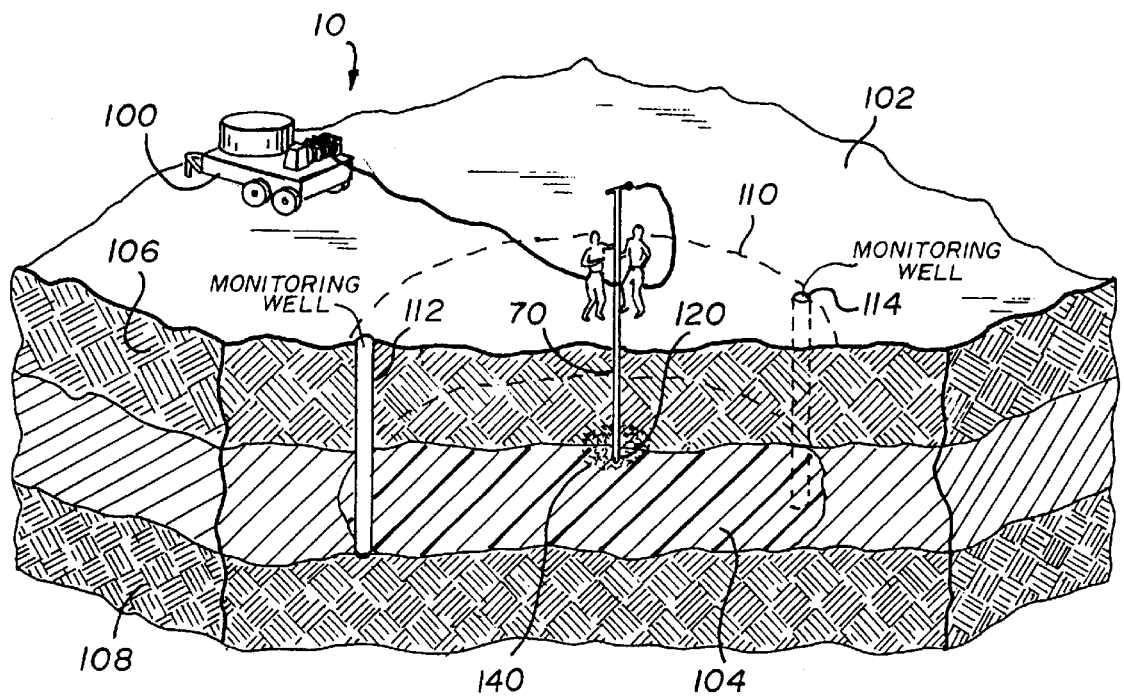
FIG. 2 is a perspective view of an underground site containing a zone of hydrocarbon contamination with the apparatus of FIG. 1 mounted on a trailer and in use in jetting an initial insertion to create a general cylindric core volume of infused fluid in the zone.

Referring to FIG. 2, the system 10 is there depicted mounted on a portable trailer 100 at a site 102 of an underground hydrocarbon pollution zone 104. As is conventional the zone 104 has been defined by the test borings. In this example, it extends between a top layer 106 and a bottom layer 108 and extends under a surface area defined by the dashed line 110. A pair of monitoring wells 112 and 114 have been sunk and it has been determined that the zone 104 contains particular hydrocarbon pollutants well above the allowed or desired level.

The soil in the zone 104 has been analyzed and a proper slurry mixture selected. For example, if sufficient oil degrading microbes are already present in the soil, it may be necessary to add only a source of oxygen and nutrients to speed the natural biodegration process. In other cases, specific oil attacking microbes may be added to the fluid.

A typical formulation for a case wherein microbes need not be added might consist of a ratio of urea: ammonium phosphate: ammonium sulfate or mono-potassium phosphate. A ratio of 2:1 0.5/0.25 is typical. Magnesium peroxide is typically applied in a 1–3% slurry by weight. The formulation may change by a cut and try process and adjusted based on the results of the monitoring program.

The combination of engine speed, hydraulic pump speed, pressure relief settings and discharge nozzle size will provide an infinitely variable range of pressure and volume to suit site specific hydrology.

The system 10 is utilized to introduce fluids into the subsurface to amend the site chemistry (i.e. addition of deficient nutrients, oxygen and microorganisms to supplement low plate counts). The system 10 is capable of delivering particulate matter in the form of time-release nutrients and time-release chemical peroxygens (i.e. magnesium peroxide, calcium peroxide) into low permeability soils and groundwater. The advantage of utilizing time-release nutrients and chemical peroxygens is that optimal biological operating parameters are maintained for a longer period thereby increasing population counts and enhancing degradation rates. In addition, operation and maintenance costs are reduced by reducing the number of treatments required at a specific site.

Prior to treating a site, samples are analyzed for nutrients, minerals, pH, contaminant concentrations, indigenous contaminant degrading microbes and dissolved oxygen. The amendment fluid is blended site specifically to achieve optimum biological operating parameters.

Although a given site may be deficient in certain nutrients or minerals, oxygen is usually one of the major limiting factors for in situ bioremediation. The amendment mixture is blended in a mixing tank which uses forced air introduced near the bottom of the tank to maintain insoluble nutrients and chemical peroxygens in suspension. The forced air also serves to oxygenate the amendment fluid. This system can also be utilized to selectively introduce pure oxygen into areas with very high contaminant concentrations to accelerate the degradation process.

Once the amendment fluid is mixed, a series of surface access points (of e.g. ¾ inch diameter) are drilled through any surface paving where required. The probe 70 (of e.g. ¼ inch inside diameter steel pipe) is inserted into the surface access point and the trigger valve is opened. The high pressure fluid exiting the probe tip liquifies the soil in front of the probe allowing the probe 70 to be easily and quickly advanced into the subsurface by hand. Lateral pressure from the soil on the probe wall above the injection nozzle effectively seals the probe hole and minimizes leakage to the surface. The probe is rapidly advanced to the contaminated interval and then more slowly advanced to the deepest extent of contamination. The high pressure forces the amendment fluid into the formation enhancing permeability in the near radius of the probe hole via a limited degree of hydraulic fracturing. Amendment fluid is also forced into the migration pathways of the natural soil. Amendment fluid is forced into the subsurface until the site specific radius of influence is saturated and fluid begins to leak to the surface. The probe is then withdrawn by hand and moved to the next location. During treatment of subsequent locations, previous probe holes are monitored for leakage to the surface. The site specific radius of influence is established on the basis of this monitoring and treatment points are spaced accordingly.

During treatment of the first location, natural migration pathways, pore spaces and pathways created by hydraulic fracturing are filled with fluid. If the location of the second hole is selected so that the radii of influence overlap, fluid being introduced in the second location forces fluid introduced in the first location back up the first probe hole (path of least resistance) to the surface.

If the radii of influence do not overlap, the second location will reach saturation of the site-specific radius of influence without impacting the previous location and the next location will be selected at a smaller distance from the prior two locations.

Utilizing this technique, it is not necessary to conduct a costly pilot program to determine site specific radius of influence. In addition, since many sites are not homogeneous, this technique permits adjustment of spacing to compensate for changing geology. As more than one treatment is typically required to achieve cleanup objectives, the treatment locations can be easily shifted 50% laterally or diagonally in later applications to ensure all the contaminated media is treated. Upon completion of each treatment, the surface access points are sealed with a non-shrinking grout.

Key biological operating parameters are monitored through soil sampling or by sampling groundwater monitoring wells which are typically installed during the required site investigation. Amendment events are scheduled and amendment fluids are formulated based on the monitoring results.

As shown in FIG. 2, the process of treatment is starting out and an initial probe being made by the probe 70. This probe may be water-jetted into the zone 108 either using the water slurry as the water-jetting material or else a separate water source. In most applications, it is more efficient and effective to use the slurry. Once the proper depth is achieved the tip or nozzle 78 of the probe 70 is advanced slowly more or less vertically through the zone 104. The high pressure fluid serves to fracture or loosen some soils and spreads out under pressure as indicated at 120. As the probe advances down through the zone 104, it creates a generally cylindrical volume or core 140 of infused fluid.

Figure 3:
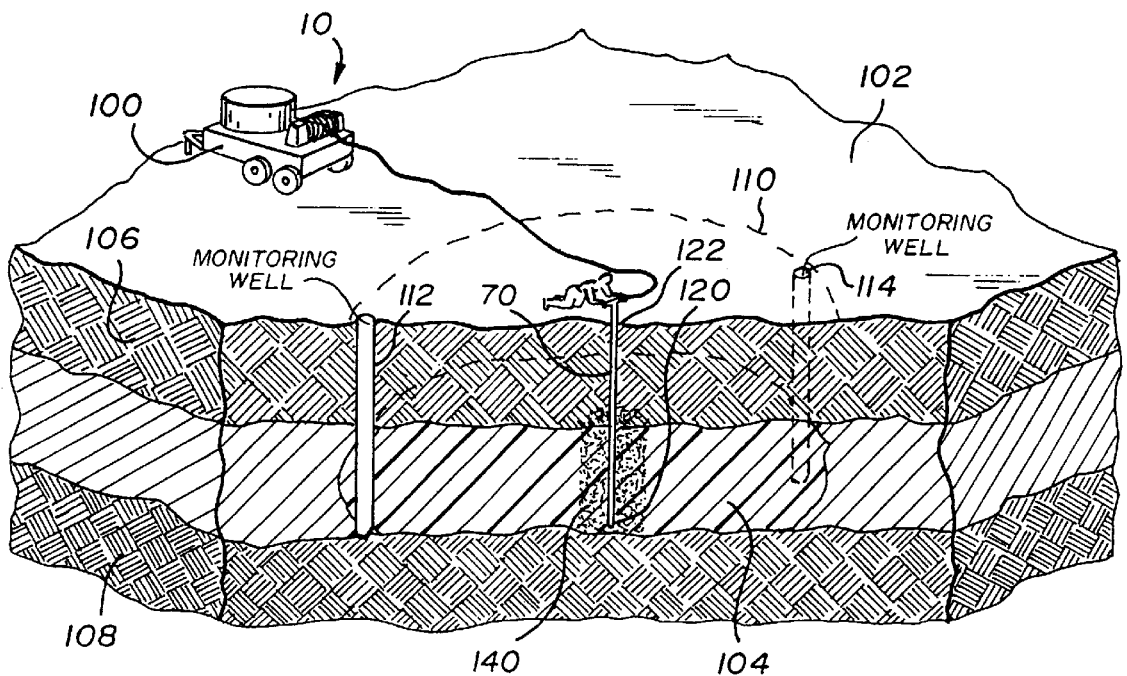
FIG. 3 is view similar to that of FIG. 2 with the probe moved to a deeper location.

The probe 70 is jetted down to the bottom of the zone 104 as shown in FIG. 3. The probe may be slowly advanced up and down to run the nozzle 120 through the zone 104 to establish the first core 140. This is continued until the core has been saturated as indicated by the welling up at the surface of the fluid from about the entry point 122 of the probe. When this occurs, the probe is removed and re-inserted at a relatively short distance away and driven vertically.

Figure 4:
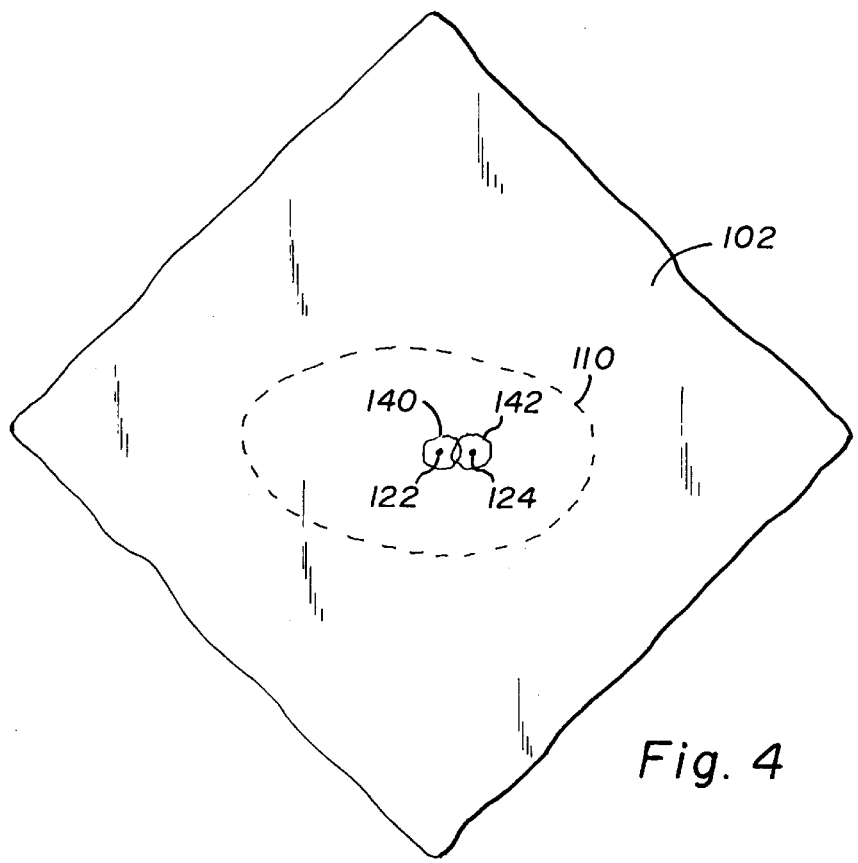
FIG. 4 is a top view of the site of FIG. 2 illustrating the lay-out of a pattern of the initial two cores of infused fluid in the zone.

As shown in FIG. 4, the second probe insert 124 is selected at somewhat less than the estimated diameter of the first core 140 and a second core 142 formed in the same manner as the first. Again, the diameter of the core 140, 142 will depend on the soil conditions of the zone 104 and the optimum spacing between insertions such as between point 122 and the insertion point 124 of the second core will vary from site to site. At first a spacing of, e.g. ten feet may be tried and then decreased or increased depending on how fast the core is formed and overlaps the earlier core. The object is to saturate the entire zone 104 by a pattern of cores such as 140 and 142. The overlapping of the cores is indicated by the fluid welling up out of the point 122 when jetting the core 142. That is, when the fluid has flowed from the core 142 to displace some of the fluid saturating the core 140 as indicated by a welling up at 122, the first probe insert point.

Figure 5:
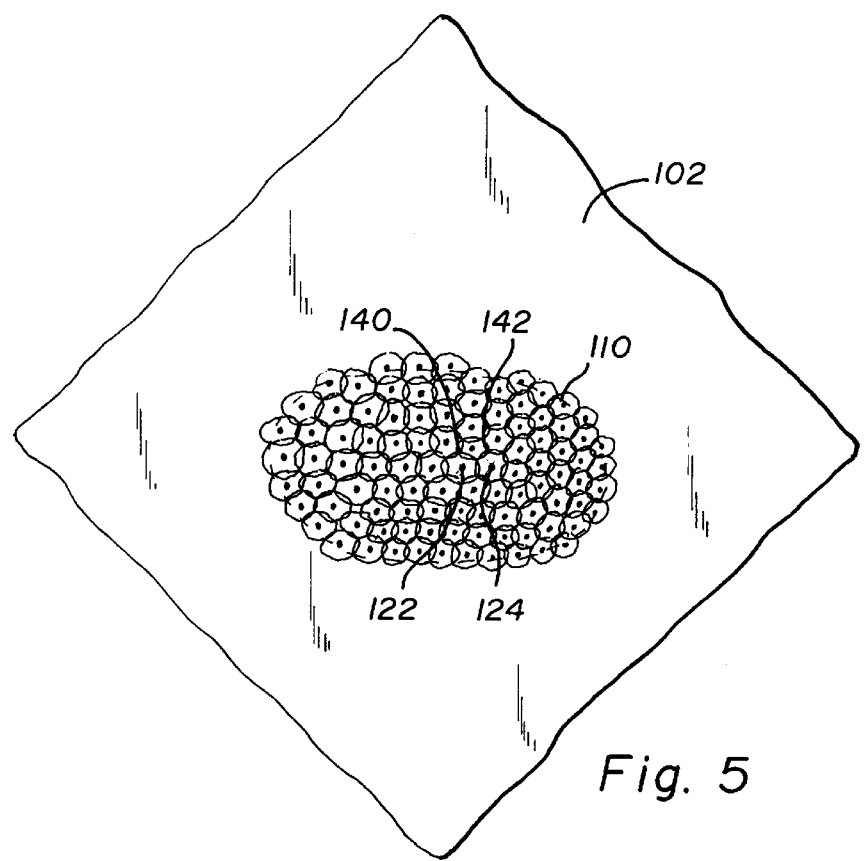
FIG. 5 is a top view similar to that of FIG. 4 of the site illustrating the location of a pattern of insert points and infused cores throughout the contamination zone.

Using this easily discernable indicia, the spacing and duration of preparing for successive probings can be determined and eventually the entire zone 104 saturated with the slurry as indicated by FIG. 5.

A typical probe and core formation may take approximately 2 to 5 minutes and a zone 104 with an area 110 of 24,000 square feet could be saturated in about 20 to 24 hours. While this process is being carried out and afterward the water in the monitoring wells is analyzed to determine the effectiveness of the treatment.

After a suitable period (e.g. 8 to 12 weeks) the treatment will have brought down the hydrocarbon contamination in the monitoring wells significantly. However, in some circumstances it may be desirable or necessary to repeat the process and to change the formula of the slurry depending upon the results obtained. If so, the new inserts should be placed intermediate to the first set to insure that the zone 104 is completely saturated with the fluid.

EXAMPLE

A prototype of the system 10 has been constructed and tested on a site that a former gas station was located on in a commercial/industrial area of Wheeling, Ill. A Phase II Environmental Assessment conducted due to a potential property transfer revealed benzene and total BETX concentrations above Illinois Environmental Protection Agency (IEPA) cleanup objectives. The site geology consists primarily of silty clay to a depth of approximately 6 to 7 feet. Underlying the shallow clay is a water bearing zone of gravelly sand, mixed with silt and clay to a depth of approximately 9 to 10 feet. A silty clay layer was then encountered beneath the water bearing material at approximately 9 to 10 feet to the boring terminus (15 feet).

The site investigation revealed significant concentrations of benzene and total BETX in both the shallow soils and the groundwater bearing zone. An estimated 8400 cubic yards of media were impacted above IEPA cleanup objectives.

Two years earlier at this site, a series of biotrenches were installed across the site. The biotrenches consisted of horizontal runs of slotted PVC backfilled with stone. Vertical risers were installed to provide access to the biosystem. The trenches were capped with clay to prevent surface runoff from entering the biosystem.

After this was accomplished, cultured microbes, oxygenated water and essential nutrients were introduced into the biosystem. Key biological operating parameters were regularly monitored. Based on the monitoring results, periodic amendments were made to the site chemistry in order to maintain optimal biological operating parameters. Remedial activities were conducted during a two year period.

Although it was apparent that significant degradation of hydrocarbons was occurring in the ground water during the two year period, continued leaching of petroleum hydrocarbons from the shallow soils and the other sources (e.g. old piping runs) prevented significant progress in achieving the groundwater cleanup objectives. Amendment mixture was readily introduced into the water bearing zones, however, it was apparent that the limited migration of the amendment mixture was occurring in the low permeability shallow soils.

With this background, the experimental and newly developed system of the present invention was then used to deliver amendment mixture directly to the shallow soils. The inventive system utilized high pressure/low volume to deliver inoculum, nutrients, atmospheric oxygen, pure oxygen, or chemical oxygen directly to all the contaminated media through a network of ¾" surface access points. The high pressure allows the probe to be easily advanced into the subsurface to the appropriate depth, and forces inoculum or amendment mixture into the migration pathways while the low volume prevents driving the contaminants. This technique is particularly effective at clay sites as the delivery system neither depends on groundwater movement for the delivery of inoculum nor on the soil permeability. Pressure and volume can be adjusted according to site specific needs. In this example, a pressure of 1,000 p.s.i. was employed and approximately 10.8 gallons per minute were injected through the probe or lance. The initial treatment of the zone took about 16 hours of active injections and was performed over a period of several days. The high pressure probe is rapidly advanced to the deepest extent of contamination. Lateral pressure from the soil on the probe wall above the injection nozzle effectively seals the probe hole and prevents leakage to the surface. The injection fluid is forced into the formation enhancing permeability in the near radius of the probe hole via a limited degree of hydraulic fracturing and by taking advantage on the horizontal structure of the natural formation. The probe is then slowly withdrawn through the contaminated interval, thereby creating a high density array or core of inoculum, nutrients and oxygen supplements through the zone of contamination.

Figure 6:
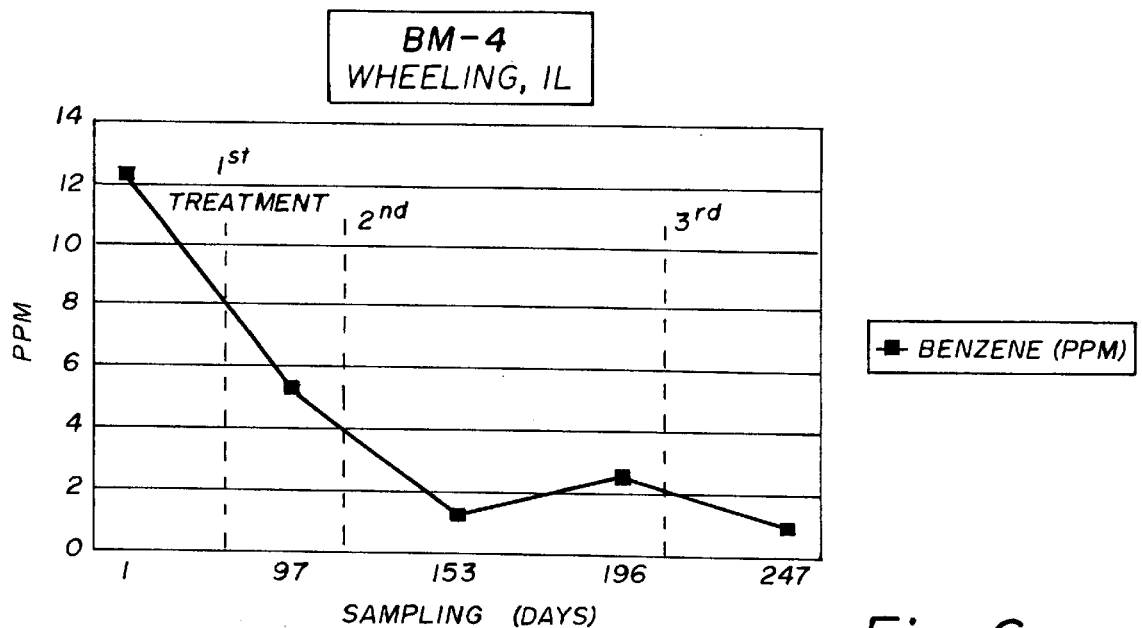
FIGS. 6 and 7 graphically depict an example of an application of the inventive system in the treatment of a specific contaminated soil and groundwater site.

Regular monitoring of key biological operating parameters was conducted through a period of seven months after the inventive treatment. Based on the monitoring results, the inventive system was utilized periodically on about days 56, 113 and 204 as indicated on FIG. 6 to amend the chemistry of both shallow soil and groundwater. Because this was an experimental system, the formulation of the fluid was varied to attempt to determine an optimum mixture for the particular soil conditions and particular contaminants.

The initial formula was approximately: Urea—50 pounds; ammonium phosphate—50 pounds; ammonium sulfate—25 pounds; and magnesium peroxide—52 pounds, and approximately 3,000 gallons were infused.

The initial formula was based upon the pH and dissolved oxygen in the water sample taken from one of the monitoring wells, heterotrophic bacterial plate counts and geochemical field tests.

For the second treatment the formula was changed to: Ammonium sulfate—50 pounds; mono-ammonium phosphate—50 pounds; and urea—50 pounds, and approximately 5,000 gallons were infused.

For the third treatment the formula was changed to: Urea—100 pounds; ammonium sulfate—50 pounds; mono-ammonium phosphate—50 pounds; and magnesium peroxide—65 pounds, and approximately 5,000 gallons were infused.

Figure 7:
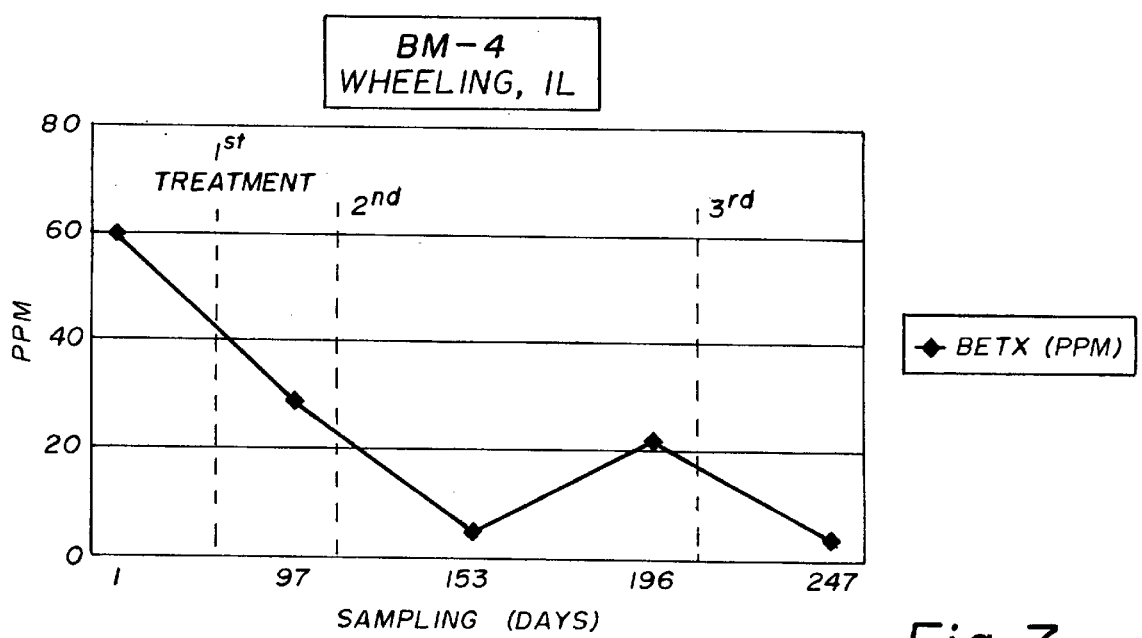

A monitoring well designated BM-4 was selected as the monitoring point due to the high concentrations of benzene (12.3 PPM) and total BETX (60.0 PPM) that were obtained from this well prior to the use of the present inventive system. See FIGS. 6 and 7. In addition to monitoring key biological operating parameters, groundwater samples from BM-4 were periodically analyzed for benzene and total BETX. During the monitoring period, leaching of contaminants from the shallow soil ceased to be major factor and significant reductions in both benzene and total BETX were observed. Benzene concentrations were reduced from 12.3 PPM before the start of the initial process to 0.951 PPM eight months later. Total BETX concentrations were reduced from 60.0 PPM to 3.85 PPM in the same period.

In one site which had an area above the zone of contamination of approximately 12,000 square feet, approximately 120 injection points were used.

The steps of this process are as follows:
a) Blend mixture;
b) mark areal extent of contamination based on available reports;
c) determine vertical intervals of contamination from available reports;
d) drill ¾" surface access points (if paved);
e) insert the lance tip into the drilled hole;
f) open trigger valve and advance probe to contaminated interval;
g) treat injection point until saturated and fluid wells to the surface around the probe;
h) determine site-specific radius of influence as described earlier;
i) continue with injection points until entire extent of contamination has been treated;
j) seal surface access points with a non-shrinking grout.

It should now be apparent that an in situ bioremediation process and system has been described which utilizes naturally occurring microbes to degrade target pollutants by delivering appropriate quantities of microbes (if necessary), nutrients and oxygen (amendment mixture) to the contaminated media.

Traditional methods require significant construction costs. The present system utilizes a series of ¾" surface access points (which may be drilled through any paving) to treat the site. The present system thus causes minimal disruption to normal site activities. Traditional methods have been demonstrated to be ineffective at low permeability (clay, silt) sites. The inventive system is effective in delivering amendment mixture directly to all the contaminated media at low permeability sites. By introducing time release chemical peroxygens and nutrients into the contaminated media, the number of treatments is reduced, thereby reducing overall project costs. By introducing a continuous source of nutrients and oxygen into all the contaminated media, an increased population of microbes is maintained thereby reducing the length of the project. This means lower overall project costs as less monitoring is required. The inventive system can cost efficiently remediate problem areas such as active tank excavations or utility trenches.

While a particular embodiment of the inventive process and apparatus have been shown and described, it will be obvious to those skilled in the art that changes and modifications may be made without departing from the invention and, therefore, the aim is to cover all such changes and modifications as fall within the true spirit and scope of the invention.

I claim:

1. A process for treating a zone of underground hydrocarbon contamination above a certain acceptable level of contamination, comprising the steps of:

(a) providing a fluid that aids in the degradation of petroleum or chemical hydrocarbons;

(b) providing the fluid under pressure to create, by fluid jetting a substantially vertical path through the zone to saturate with said fluid, a core extending vertically through the zone and horizontally outward from said path;

(c) repeating step (b) at other locations to form a series of overlapping cores that substantially includes all of the zone;

(d) allowing the degradation to occur, thereafter testing to determine the degree of contamination remaining and, if above the acceptable level, repeating steps (a), (b), (c) and this step (d) until the contamination is reduced to below the acceptable level.

2. The process of claim 1 employing a lance of probe having a free end equipped with a nozzle from whence fluid may be injected, said lance or probe being of a length that it may be manually maneuvered and fluid-jetted into the ground so as to deliver fluid under pressure to the zone and wherein step (b) is performed by manually maneuvering the lance or probe along said path into said zone and wherein said fluid is a slurry of water and oxygen providing chemicals.

3. A process for treating a zone of underground hydrocarbon contamination above a certain acceptable level of contamination, comprising the steps of:

(a) providing a fluid that aids in the degradation of petroleum or chemical hydrocarbons;

(b) providing the fluid under pressure to create, by jetting a substantially vertical path through the zone to saturate with said fluid, a core extending vertically through the zone and horizontally outward from said path;

(c) repeating step (b) at other locations to form a series of overlapping cores that substantially includes all of the zone;

(d) allowing the degradation to occur, thereafter testing to determine the degree of contamination remaining and, if above the acceptable level, repeating steps (a), (b), (c) and this step (d) until the contamination is reduced to below the acceptable level; and wherein the zone is below a surface and said step (b) is performed by lancing from an entry hole in the surface downward into the zone and step (c) is performed at locations adjacent to a prior core and during step (c) the fluid flow is monitored at the entry hole for that prior core to gauge the overlapping or not of said cores.

4. The process of claim 2 wherein said oxygen providing chemical is magnesium peroxide.

* * * * *